US009904101B2

(12) United States Patent
Xie

(10) Patent No.: US 9,904,101 B2
(45) Date of Patent: Feb. 27, 2018

(54) DISPLAY PANEL AND DISPLAY APPARATUS

(71) Applicants: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

(72) Inventor: Chang Xie, Guangdong (CN)

(73) Assignees: SHENZHEN CHINA STAR OPTOELECTRONICS TECHNOLOGY CO., LTD., Shenzhen, Guangdong (CN); WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 139 days.

(21) Appl. No.: 14/655,193

(22) PCT Filed: Apr. 7, 2015

(86) PCT No.: PCT/CN2015/075945
§ 371 (c)(1),
(2) Date: Jun. 24, 2015

(87) PCT Pub. No.: WO2016/155030
PCT Pub. Date: Oct. 6, 2016

(65) Prior Publication Data
US 2016/0313602 A1 Oct. 27, 2016

(30) Foreign Application Priority Data
Mar. 30, 2015 (CN) .......................... 2015 1 0143545

(51) Int. Cl.
G02F 1/1335 (2006.01)
G02F 1/1343 (2006.01)
(Continued)

(52) U.S. Cl.
CPC .. *G02F 1/133555* (2013.01); *G02F 1/133553* (2013.01); *G02F 1/133526* (2013.01); *G02F 2001/133567* (2013.01)

(58) Field of Classification Search
CPC ............. G02F 1/1335; G02F 1/133514; G02F 1/133526; G02F 1/133536;
(Continued)

(56) References Cited

U.S. PATENT DOCUMENTS 7,965,357 B2* 6/2011 Van De Witte ... G02F 1/133555
349/114
2001/0020990 A1* 9/2001 Moon ............... G02F 1/133514
349/96
(Continued)

FOREIGN PATENT DOCUMENTS

| CN | 1829937 A | 9/2006 |
|---|---|---|
| CN | 1991503 A | 7/2007 |

(Continued)

*Primary Examiner* — Ryan Crockett
(74) *Attorney, Agent, or Firm* — Ladas & Parry LLP

(57) ABSTRACT

A display panel and a display device module are disclosed. A TFT array substrate contained in the display panel includes a second substrate, a pixel electrode layer, a carrier layer, and a reflective layer. The second substrate includes a first region and a second region. A carrier platform contained in the carrier layer is disposed on the pixel electrode layer, in which a position of the carrier platform corresponds with the second region; and a reflection sheet contained in the reflective layer is disposed on the carrier platform, wherein the reflection sheet has a first reflective surface and a second
(Continued)

reflective surface. The present invention improves the utilization of light in the backlight module.

10 Claims, 3 Drawing Sheets

(51) Int. Cl.
 *G02F 1/1368* (2006.01)
 *G02F 1/137* (2006.01)
(58) Field of Classification Search
 CPC ......... G02F 1/133555; G02F 1/134309; G02F 1/1368; G02F 1/137; G02F 2201/121; G02F 2201/123
 See application file for complete search history.

(56) References Cited

U.S. PATENT DOCUMENTS

| | | | |
|---|---|---|---|
| 2004/0027510 A1* | 2/2004 | Iijima | G02F 1/133528 349/61 |
| 2004/0027517 A1* | 2/2004 | Chol | G02F 1/133553 349/113 |
| 2004/0233359 A1* | 11/2004 | Nam | G02F 1/133371 349/114 |
| 2007/0153174 A1* | 7/2007 | Kim | G02F 1/136227 349/114 |
| 2008/0013017 A1* | 1/2008 | Ishikawa | G02F 1/133371 349/98 |
| 2008/0198306 A1* | 8/2008 | Shibazaki | G02F 1/133555 349/98 |
| 2011/0272697 A1* | 11/2011 | Lee | G02F 1/133553 257/59 |
| 2012/0300144 A1* | 11/2012 | Lee | G02F 1/139 349/33 |
| 2013/0107155 A1* | 5/2013 | Guo | G02F 1/1368 349/43 |
| 2014/0098330 A1* | 4/2014 | Nam | G02F 1/133536 349/96 |

FOREIGN PATENT DOCUMENTS

| | | |
|---|---|---|
| CN | 103018949 A | 4/2013 |
| CN | 203204275 U | 9/2013 |
| KR | 20100053352 A | 5/2010 |

\* cited by examiner

DISPLAY PANEL AND DISPLAY APPARATUS

BACKGROUND OF THE INVENTION

Field of the Invention

The present invention relates to a field of display technology, and more particularly to a display panel and a display apparatus.

Description of Prior Art

Conventional liquid crystal display (LCD) devices include a transmissive-type display device, a reflective-type display device, and a trans-reflective type display device.

The transmissive-type display device mentioned above mainly uses a back light source as its light source. The backlight is disposed on a back side of the LCD panel in the transmissive-type display device. Pixel electrodes of the transmissive-type display device are transparent electrodes, in this way, and it is beneficial for backlight light transmitted through the liquid crystal layer to display an image. An advantage of the transmission type display device is that the transmission type display device can display bright images in a dark environment, but a drawback of the transmission type display device is that the light which is able to be transmitted through the light source accounts for a smaller proportion. Due to poor utilization of the back light source, a greatly increased luminance of the backlight is required in order to improve the display brightness. As a result, its energy consumption is quite high.

The reflective-type display device mainly uses a front light source or an external light source as its light source. An array substrate in the reflective type display device generally uses metals or other materials having good reflection characteristics to reflect the light from the front light source or the external light source. An advantage of the reflective-type display device is that it is capable of utilizing the external light source so that its power consumption is lower relative to the other display devices types, but a drawback of the reflective-type display device is that it cannot display images in a dark place due to relying on an external light source.

The trans-reflective type display device can be regarded as a transmissive type display device in combination with a reflective-type display device. The trans-reflective type display device is not only arranged with a reflective region but also arranged with a transmissive area, so it can take advantage of a backlight and a front light or an external light source for display. The trans-reflective type display device both has the advantage of the transmissive type display device and the advantage of the reflective type display device. No matter if the environment is under a bright or dark ambient light condition, a bright image can be displayed, i.e., it can be used either indoors or outdoors. Therefore, the trans-reflective type display device is widely used as a display device in portable and mobile electronic products such as mobile phones, digital cameras, handheld computers, and other mobile products.

In practice, the inventors have found that the conventional LCD device at least has the following problems:

In the above conventional trans-reflective display device, partial light of the backlight source is blocked. The blocked partial light of the backlight source cannot be used, so as to result in a waste of the backlight source.

Therefore, there is a need to propose a new technical solution for solving the aforementioned problem.

SUMMARY OF THE INVENTION

The objective of the present invention is to provide a display panel and a display device, which can improve the utilization of light in the backlight module and reduce energy consumption.

To solve the foregoing problems, the present invention provides the following technical solutions.

According to one aspect of the present invention, an LCD panel comprises:
 a color film substrate, which includes a first substrate, a color film layer, and a common electrode layer;
 a liquid crystal layer; and
 a TFT array substrate, which comprises:
  a second substrate including at least a first region and at least a second region;
  a pixel electrode layer disposed on the first surface of the second substrate;
  a carrier layer including at least one carrier platform disposed on the pixel electrode layer, wherein a position of the carrier platform corresponds with the second region; and
  a reflective layer including at least one reflection sheet disposed on the carrier platform, wherein the reflection sheet has a first reflective surface and a second reflective surface and the reflection sheet is configured to reflect a first beam of light and a second beam of light, in which the first beam of light is a beam of light directed from outside the display panel to the first substrate and enters into the reflection sheet, and the second beam of light is a beam of light directed from outside the display panel to the second substrate and enters into the light reflection sheet;
 the display panel further comprises:
 a first polarizer disposed on the first substrate; and
 a second polarizer disposed on the second surface of the second substrate, the second polarizer including at least one hollow zone where the position of the hollow zone corresponds with the second region, the hollow zone being configured to reflect the second beam of light by transmitting the second beam of light through the light reflection sheet;
 wherein the pixel electrode layer includes a first electrode and a second electrode, the first electrode is disposed on the first region and the second electrode is disposed on the second region;
 wherein the first electrode is configured to apply directly a first electric field force to a first liquid crystal molecules which are located in the first region so that the first liquid crystal molecules deflect; and
 wherein the second electrode is configured to apply a second electric field force to a second liquid crystal molecules which are located in the second region through the carrier platform and the reflection sheet so that the second liquid crystal molecules deflect.

In the above display panel, the carrier layer is a transparent or translucent resin layer configured to carry the reflection sheet and transmit the second beam of light.

According to another aspect of the present invention, a display panel comprises:
 a color film substrate, which includes a first substrate, a color film layer and a common electrode layer;
 a liquid crystal layer; and
 a TFT array substrate, which comprises:
  a second substrate including at least a first region and at least a second region;
  a pixel electrode layer disposed on the first surface of the second substrate;
  a carrier layer including at least one carrier platform disposed on the pixel electrode layer, wherein a position of the carrier platform corresponds with the second region; and a reflective layer including at least one reflection sheet disposed on the carrier platform, wherein the reflection sheet has a first reflective surface and a second reflective surface.

In the above display panel, the reflection sheet is configured to reflect a first beam of light and a second beam of light, in which the first beam of light is a beam of light directed from outside the display panel to the first substrate and enters into the reflection sheet as well as the second beam of light is a beam of light directed from outside the display panel to the second substrate and enters into the light reflection sheet.

In the above display panel, the display panel further comprises:
a first polarizer disposed on the first substrate; and
a second polarizer disposed on the second surface of the second substrate, the second polarizer including at least one hollow zone where the position of the hollow zone corresponds with the second region, the hollow zone being configured to reflect the second beam of light by transmitting the second beam of light through the light reflection sheet.

In the above display panel, the carrier layer is a transparent or translucent resin layer configured to carry the reflection sheet and transmit the second beam of light.

In the above display panel, the pixel electrode layer includes a first electrode and a second electrode, the first electrode being disposed on the first region and the second electrode being disposed on the second region;
the first electrode being configured to apply directly a first electric field force to a first liquid crystal molecules which are located in the first region so that the first liquid crystal molecules deflect;
the second electrode being configured to apply a second electric field force to a second liquid crystal molecules which are located in the second region through the carrier platform and the reflection sheet so that the second liquid crystal molecules deflect.

In the above display panel, the reflection sheet is a metal sheet and both surfaces of the reflection sheet are smooth surfaces, and the two surfaces are the first reflective surface and the second reflective surface respectively.

In the above display panel, the reflection sheet is a double-sided lens including a first transparent dielectric layer, a first reflective coating layer, and a second transparent dielectric layer, the first reflective coating layer being disposed between the first transparent dielectric layer and the second transparent dielectric layer; wherein the first transparent dielectric layer and the first reflective coating layer constitute a first lens and the first reflective surface associates with the first lens, and the second transparent dielectric layer and the first a reflective coating constitute the second lens and the second reflective surface associates with the second lens; and the first transparent dielectric layer faces the liquid crystal layer and the second transparent dielectric layer faces the carrier platform.

In the above display panel, the reflection sheet is a single-sided lens including a third transparent dielectric layer and the second reflective coating layer, the second reflective coating layer being disposed between the third transparent dielectric layer and the carrier platform; wherein the third transparent dielectric layer and the second reflective coating layer constitute a third lens and the first reflective surface associates with the third lens as well as the carrier platform and the second reflective coating layer constitute a fourth lens and the second reflective surface associates with the fourth lens; and the third transparent dielectric layer faces the liquid crystal layer.

In the above display panel, the second reflective surface of the reflective sheet is uneven mirror surface and the second reflective surface having an uneven shape is configured to allow more light from the second beam of light to enter into the liquid crystal layer through the second polarizer after the second beam of light is reflected from the reflection sheet.

According to yet another aspect of the present invention, a display device comprises a backlight module and a display panel, and the display panel comprises:
a color film substrate, which includes a first substrate, a color film layer, and a common electrode layer;
a liquid crystal layer; and
a TFT array substrate, which comprises:
a second substrate including at least a first region and at least a second region;
a pixel electrode layer disposed on the first surface of the second substrate;
a carrier layer including at least one carrier platform disposed on the pixel electrode layer, wherein a position of the carrier platform corresponds with the second region; and
a reflective layer including at least one reflection sheet disposed on the carrier platform, wherein the reflection sheet has a first reflective surface and a second reflective surface.

In the above display device, the reflection sheet is configured to reflect a first beam of light and a second beam of light, in which the first beam of light is a beam of light directed from outside the display panel to the first substrate and enters into the reflection sheet, and the second beam of light is a beam of light directed from outside the display panel to the second substrate and enters into the light reflection sheet.

In the above display device, the display panel further comprises:
a first polarizer disposed on the first substrate; and
a second polarizer disposed on the second surface of the second substrate, the second polarizer including at least one hollow zone where the position of the hollow zone corresponds with the second region, the hollow zone being configure to reflect the second beam of light by transmitting the second beam of light through the light reflection sheet.

In the above display device, the carrier layer is a transparent or translucent resin layer configured to carry the reflection sheet and transmit the second beam of light.

In the above display panel, the pixel electrode layer includes a first electrode and a second electrode, and the first electrode is disposed on the first region and the second electrode is disposed on the second region;
the first electrode is configured to apply directly a first electric field force to a first liquid crystal molecules which are located in the first region so that the first liquid crystal molecules deflect;
the second electrode is configured to applying a second electric field force to a second liquid crystal molecules which are located in the second region through the carrier platform and the reflection sheet so that the second liquid crystal molecules deflect.

In the above display device, the reflection sheet is a metal sheet on which both surfaces are smooth surfaces, and the two surfaces are respectively the first reflective surface and the second reflective surface.

In the above display device, the reflection sheet is a double-sided lens including a first transparent dielectric layer, a first reflective coating layer, and a second transparent dielectric layer. The first reflective coating layer is disposed between the first transparent dielectric layer and the second transparent dielectric layer, wherein the first transparent dielectric layer and the first reflective coating layer constitute a first lens and the first reflective surface associates with the first lens, and the second transparent dielectric layer and the first a reflective coating constitute the second lens and the second reflective surface associates with the second lens; and the first transparent dielectric layer faces the liquid crystal layer and the second transparent dielectric layer faces the carrier platform.

In the above display device, the reflection sheet is a single-sided lens including a third transparent dielectric layer and the second reflective coating layer, the second reflective coating layer being disposed between the third transparent dielectric layer and the carrier platform; wherein the third transparent dielectric layer and the second reflective coating layer constitute a third lens and the first reflective surface associates with the third lens as well as the carrier platform and the second reflective coating layer constitute a fourth lens and the second reflective surface associates with the fourth lens; and the third transparent dielectric layer faces the liquid crystal layer.

In the above display device, the second reflective surface of the reflective sheet is an uneven mirror surface and the second reflective surface having an uneven shape is configured to allow more light from the second beam of light to enter into the liquid crystal layer through the second polarizer after the second beam of light is reflected from the reflection sheet.

Compared with the prior art, the present invention allows the blocked beam of light in the backlight module to be reused. Consequently, the utilization of light in the backlight module is increased and the energy consumption in the display device can be reduced to some extent.

The foregoing, as well as additional objects, features, and advantages of the invention will be more apparent from the following detailed description, which proceeds with reference to the accompanying drawings.

DETAILED DESCRIPTION OF THE INVENTION

The terms used in this specification, "one embodiment" or "an embodiment" means that the description in connection with the embodiment serves as an example, instance, or illustration of the disclosure. Furthermore, the articles "a" and "an" as used in this specification and the appended claims should generally be construed to mean "one or multiple", unless specified or clear from context to be directed to be a singular form.

Figure 1:
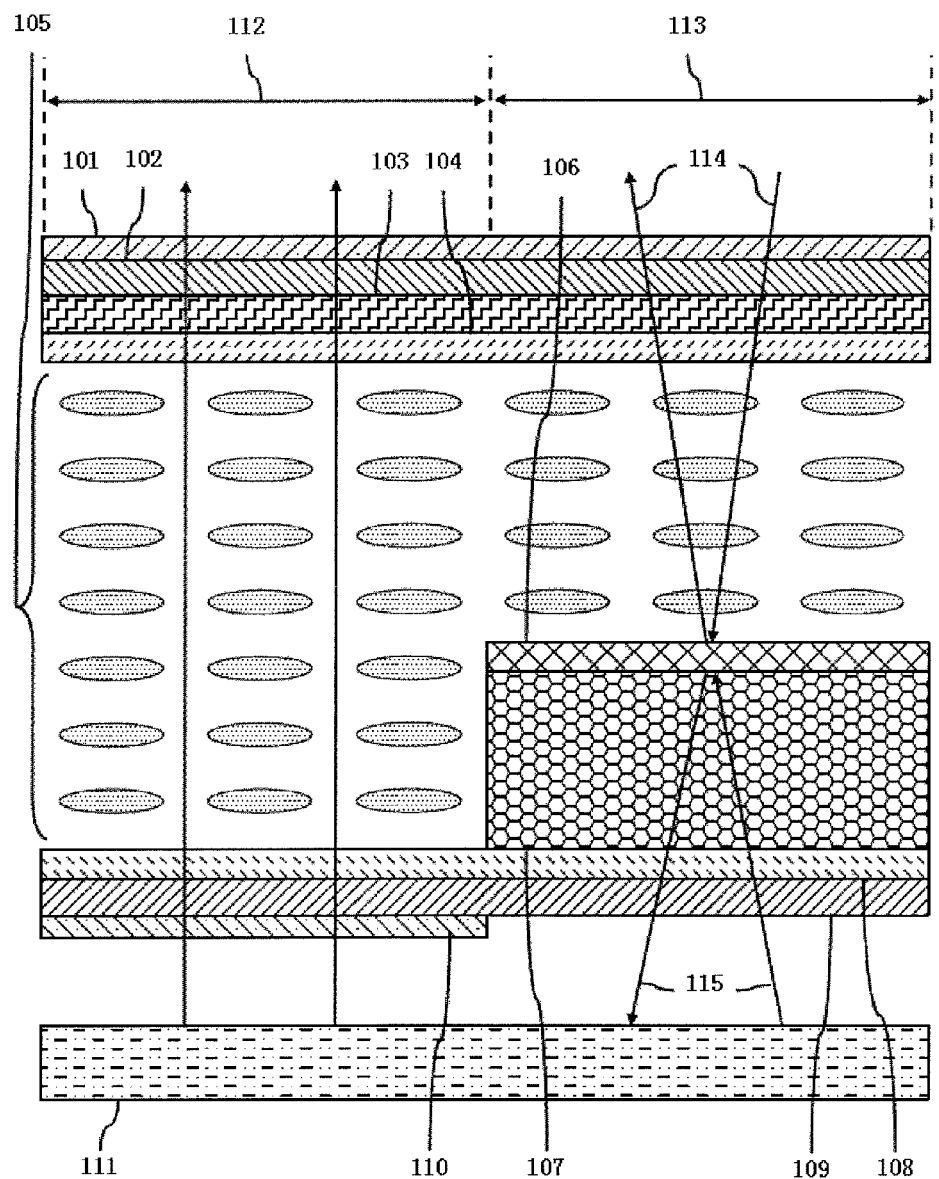
FIG. 1 is a schematic diagram of a display device in accordance with a first preferred embodiment of the present invention.

Refer to FIG. 1, which is a schematic diagram of a display device in accordance with a first preferred embodiment of the present invention.

The display device in the embodiment includes a backlight module 111 and a display panel. The backlight module 111 and the display panel are superposed and combined together as a whole. The display panel described above may be a TFT-LCD (Thin Film Transistor Liquid Crystal Display) and the like.

The display panel includes a color film substrate, liquid crystal layer 105, and a TFT array substrate. The color film substrate and the TFT array substrate are superposed and combined together as a liquid crystal box, and the liquid crystal layer 105 is disposed inside the liquid crystal box.

The color film substrate includes a first substrate 102, a color film layer 103, and a common electrode layer 104. The color layer 103 is disposed between the first substrate 102 and the common electrode layer 104.

The TFT array substrate includes a second substrate 109, a pixel electrode layer 108, a carrier layer, and a reflective layer. The second substrate 109 includes at least a first region 112 and at least a second region 113. The pixel electrode layer 108 is disposed on the first surface of the second substrate 109. The carrier layer comprises at least one carrier platform 107. The carrier platform 107 is disposed on the pixel electrode layer 108, and a position of the carrier platform 107 corresponds with the second region 113. The reflective layer includes at least one reflection sheet 106, and the reflection sheet 106 is disposed on the carrier platform 107. The reflection sheet 106 has a first reflective surface and a second reflective surface, and the first reflective surface faces the liquid crystal layer 105 and the second reflective surface faces the carrier platform 107.

In this embodiment, a first thickness of the liquid crystal layer 105 located at the first region 112 is greater than a second thickness of the liquid crystal layer 105 located at the second region 113. Namely, a first distance between the color film substrate and the TFT array substrate located at the first region 112 is greater than a second distance between the color film substrate and the TFT array substrate located at the second region 113.

In this embodiment, the reflection sheet 106 is configured to reflect a first beam of light 114 and a second beam of light 115, in which the first beam of light 114 is directed from outside the display panel to the first substrate 102 and enters into the reflection sheet 106 as well as the second beam of light 115 is directed from outside the display panel to the second substrate 109 and enters into the light reflection sheet 106.

In this embodiment, the display panel further comprises a first polarizer 101 and the second polarizer 110. The first polarizer 101 is disposed on the first substrate 102. The second polarizer 110 is disposed on the second surface of the second substrate 109, and the second polarizer 110 includes at least one hollow zone where the position of the hollow zone corresponds with the second region 113. The hollow zone is configured to reflect the second beam of light 115 by transmitting the second beam of light 115 through the light reflection sheet 106.

In this embodiment, the carrier layer is a transparent or translucent resin layer, and the resin layer is configured to carry the reflection sheet 106 and transmit the second beam of light 115.

In this embodiment, the pixel electrode layer 108 includes a first electrode and a second electrode, wherein the first electrode is disposed on the first region 112 and the second electrode is disposed on the second region 113. The first electrode is configured to apply directly a first electric field force to a first liquid crystal molecules 112 which are located in the first region so that the first liquid crystal molecules deflect. The second electrode is configured to applying a second electric field force to a second liquid crystal molecules which are located in the second region 113 through the carrier platform 107 and the reflection sheet 106 so that the second liquid crystal molecules deflect.

In this embodiment, the reflection sheet 106 is a metal sheet, and both surfaces of the metal sheet are smooth surfaces. The two surfaces are respectively the first reflective surface and the second reflective surface.

In this embodiment, the backlight module 111 includes a light source, a reflector, and a light guide plate. The light guide plate is configured to reflect the light emitted from the light source to the second polarizer 110 and to reflect the second beam of light 115, which is reflected from the reflection sheet 106, to the second polarizer 110 so that the second beam of light 115 enters into the liquid crystal layer 105 through the second polarizer 110.

By the above technical solution, the blocked beam of light in the backlight module 111 is allowed to be reused, and thereby the utilization of light in the backlight module 111 is increased, and to some extent the energy consumption of the display device has been reduced.

Figure 2:
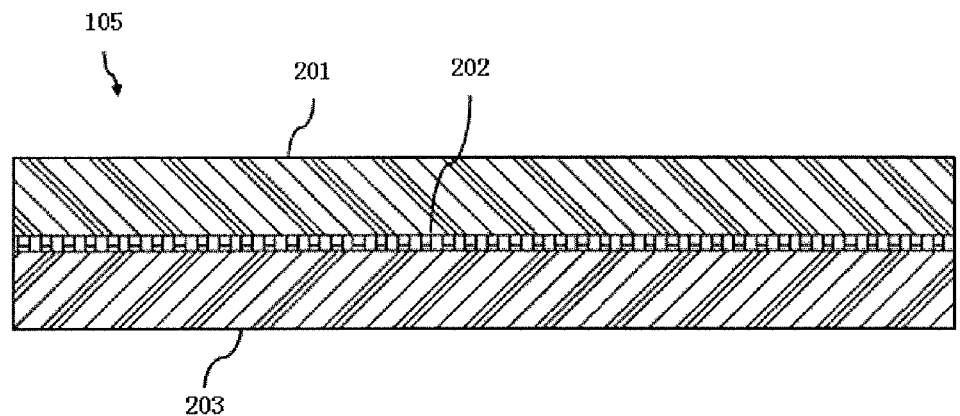
FIG. 2 is a schematic diagram of a reflection sheet in accordance with a second preferred embodiment of a display device of the present invention.

Refer to FIG. 2, which is a schematic diagram of a reflection sheet in accordance with a second preferred embodiment of a display device of the present invention. The second embodiment is similar to the first embodiment, except that:

The reflection sheet 106 is a double-sided lens, which comprises a first transparent dielectric layer 201, a first reflective coating layer 202, and a second transparent dielectric layer 203. The first reflective coating layer 202 is disposed between the first transparent dielectric layer 201 and the second transparent dielectric layer 203, in which the first transparent dielectric layer 201 and the first reflective coating layer 202 constitute a first lens and the first reflective surface associates with the first lens; the second transparent dielectric layer 203 and the first a reflective coating 202 constitute the second lens and the second reflective surface associates with the second lens.

The first transparent dielectric layer 201 faces the liquid crystal layer 105, and the second transparent dielectric layer 203 faces the carrier platform 107.

Figure 3:
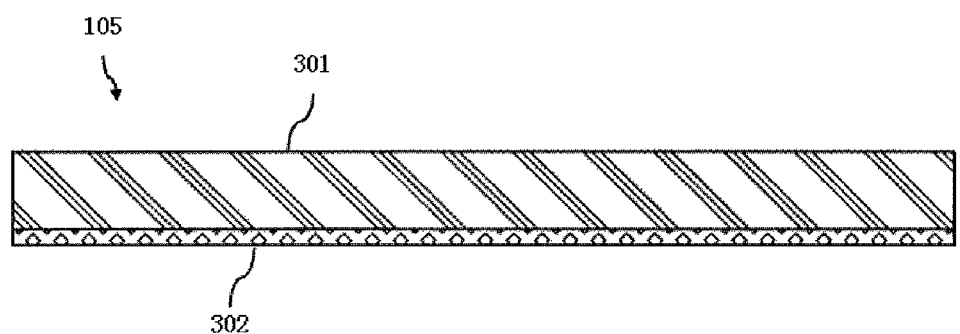
FIG. 3 is a schematic diagram of a reflection sheet in accordance with a third preferred embodiment of a display device of the present invention.

Refer to FIG. 3, which is a schematic diagram of a reflection sheet 106 in accordance with a third preferred embodiment of a display device of the present invention. The embodiment of the present invention is similar to the first or the second embodiment, except that:

The reflection sheet 106 is a single-sided lens, which comprises a third transparent dielectric layer 301 and the second reflective coating layer 302. The second reflective coating layer 302 is disposed between the third transparent dielectric layer, and the carrier platform 107, namely, and the second reflective coating layer 302 is disposed between the third transparent dielectric layer and the transparent or translucent resin layer. The third transparent dielectric layer and the second reflective coating layer 302 constitute a third lens and the first reflective surface associates with the third lens; the carrier platform 107 and the second reflective coating layer 302 constitute a fourth lens, and the second reflective surface associates with the fourth lens.

The third transparent dielectric layer 301 faces the liquid crystal layer 105.

Figure 4:
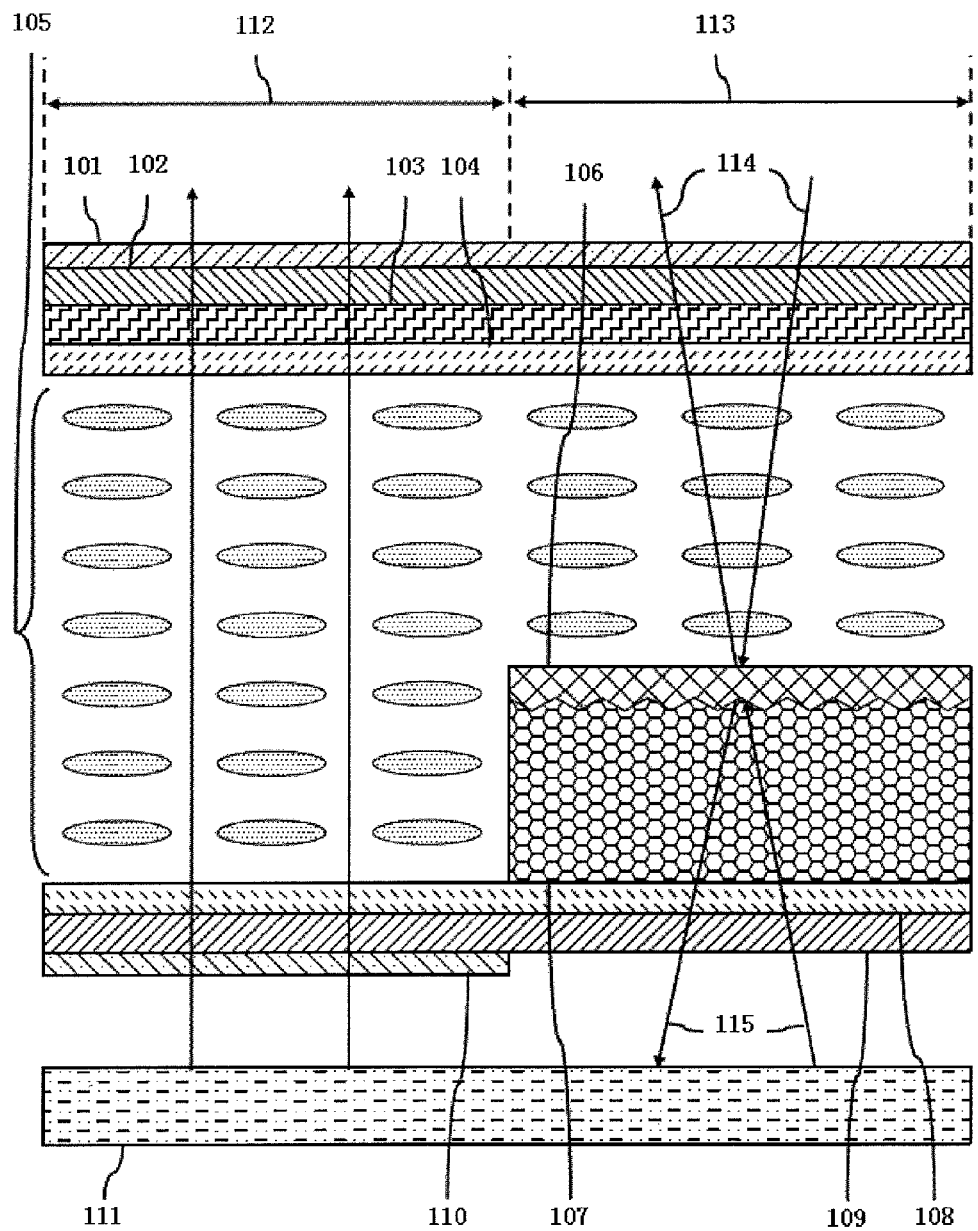
FIG. 4 is a schematic diagram of a display device in accordance with a fourth preferred embodiment of the present invention.

Refer to FIG. 4, which is a schematic diagram of a display device in accordance with a fourth preferred embodiment of the present invention. The embodiment of the present invention is similar to any one embodiment of the above-described the first to the third embodiments, except that:

In the embodiment, the second reflective surface of the reflective sheet 106 is an uneven mirror surface, for example, the second reflective surface is arranged as a wavy mirror surface. The second reflective surface having an uneven shape/wavy shape is configured to allow more light from the second beam of light 115 to enter into the liquid crystal layer 105 through the second polarizer 110 after the second beam of light is reflected from the reflection sheet 106.

Accordingly, the carrier platform 107 facing the surface of the reflective sheet 106 is also configured to be an uneven shape, for example, wave-like shape, the shape of the surface of the carrier platform 107 facing the surface of the reflective sheet 106 is adapted to the shape of the second reflective surface of the reflection sheet 106.

Despite one or more preferred embodiments of the present invention having been illustrated and described, those having ordinary skills in the art may easily contemplate equivalent changes and modifications according to the disclosure and drawings of the present invention. All such modifications and variations are considered to be encompassed in the scope defined by the claims of the present invention. Particularly with regard to the various functions performed by the above-described components, the terms used to describe such components are intended to perform the specified function corresponding to the component, which may be performed by any other components (functionally equivalent unless otherwise indicated), even though other components are not the same in the structure as shown in the exemplary implementations of this specification. Furthermore, although a particular feature relating to a number of embodiments has been disclosed in this specification, this feature may be combined with one or more other features to have other embodiments which are desirable and advantageous to a given or particular application. Moreover, the terms "including", "having", "containing" or variations thereof are used in the detailed description or the claims with a meaning similar to the term "comprising".

In summary, while the present invention has been described with the aforementioned preferred embodiments, it is preferable that the descriptions relating to the above embodiments should be construed as exemplary rather than as limiting of the present invention. One of ordinary skill in the art can make a variety of modifications and variations without departing from the spirit and scope of the present invention as defined by the following claims.

What is claimed is:

1. A display panel comprising:
   a color film substrate, which includes a first substrate, a color film layer, and a common electrode layer;
   a liquid crystal layer; and
   a TFT array substrate, which comprises:
   a second substrate including at least a first region and at least a second region;
   a pixel electrode layer disposed on a first surface of the second substrate;
   a carrier layer including at least one carrier platform disposed on the pixel electrode layer, wherein a position of the carrier platform corresponds with the second region; and
   a reflective layer including at least one reflection sheet disposed on the carrier platform, wherein the reflection sheet has a first reflective surface and a second reflective surface, wherein the first reflective surface and the second reflective surface are flat, wherein the reflection sheet is a double-sided lens including a first transparent dielectric layer, a first reflective coating layer, and a second transparent dielectric layer, the first reflective coating layer being disposed between the first transparent dielectric layer and the second transparent dielectric layer;

wherein the first transparent dielectric layer and the first reflective coating layer constitute a first lens and the first reflective surface associates with the first lens, and the second transparent dielectric layer and the first a reflective coating constitute the second lens and the second reflective surface associates with the second lens; and the first transparent dielectric layer faces the liquid crystal layer and the second transparent dielectric layer faces the carrier platform.

2. The display panel according to claim 1, wherein the reflection sheet is configured to reflect a first beam of light and a second beam of light, in which the first beam of light is a beam of light directed from outside the display panel to the first substrate and enters into the reflection sheet as well as the second beam of light is a beam of light directed from outside the display panel to the second substrate and enters into the light reflection sheet.

3. The display panel according to claim 2, wherein the display panel further comprises:
a first polarizer disposed on the first substrate; and
a second polarizer disposed on a second surface of the second substrate, the second polarizer including at least one hollow zone where the position of the hollow zone corresponds with the second region, the hollow zone being configured to reflect the second beam of light by transmitting the second beam of light through to the light reflection sheet.

4. The display panel according to claim 2, wherein the carrier layer is a transparent or translucent resin layer configured to carry the reflection sheet and transmit the second beam of light.

5. The display panel according to claim 1, wherein the pixel electrode layer includes a first electrode and a second electrode, the first electrode being disposed on the first region and the second electrode being disposed on the second region;
the first electrode being configured to apply directly a first electric field force to a first liquid crystal molecules which are located in the first region so that the first liquid crystal molecules deflect;
the second electrode being configured to apply a second electric field force to a second liquid crystal molecules which are located in the second region through the carrier platform and the reflection sheet so that the second liquid crystal molecules deflect.

6. An display device comprising:
a backlight module; and
a display panel which comprises:
a color film substrate, which includes a first substrate, a color film layer and a common electrode layer;
a liquid crystal layer; and
a TFT array substrate, which comprises:
a second substrate including at least a first region and at least a second region;

a pixel electrode layer disposed on a first surface of the second substrate;
a carrier layer including at least one carrier platform disposed on the pixel electrode layer, wherein a position of the carrier platform corresponds with the second region; and
a reflective layer including at least one reflection sheet disposed on the carrier platform, wherein the reflection sheet has a first reflective surface and a second reflective surface, wherein the first reflective surface and the second reflective surface are flat,
wherein the reflection sheet is a double-sided lens including a first transparent dielectric layer, a first reflective coating layer, and a second transparent dielectric layer, the first reflective coating layer being disposed between the first transparent dielectric layer and the second transparent dielectric layer;
wherein the first transparent dielectric layer and the first reflective coating layer constitute a first lens and the first reflective surface associates with the first lens, and the second transparent dielectric layer and the first a reflective coating constitute the second lens and the second reflective surface associates with the second lens; and
the first transparent dielectric layer faces the liquid crystal layer and the second transparent dielectric layer faces the carrier platform.

7. The display device according to claim 6, wherein the reflection sheet is configured to reflect a first beam of light and a second beam of light, in which the first beam of light is a beam of light directed from outside the display panel to the first substrate and enters into the reflection sheet, and the second beam of light is a beam of light directed from outside the display panel to the second substrate and enters into the light reflection sheet.

8. The display device according to claim 7, wherein the display panel further comprises:
a first polarizer disposed on the first substrate; and
a second polarizer disposed on a second surface of the second substrate, the second polarizer including at least one hollow zone where the position of the hollow zone corresponds with the second region, the hollow zone being configured to reflect the second beam of light by transmitting the second beam of light through to the light reflection sheet.

9. The display device according to claim 7, wherein the carrier layer is a transparent or translucent resin layer configured to carry the reflection sheet and transmit the second beam of light.

10. The display device according to claim 6, wherein the pixel electrode layer includes a first electrode and a second electrode, the first electrode is disposed on the first region and the second electrode is disposed on the second region;
the first electrode is configured to apply directly a first electric field force to a first liquid crystal molecules which are located in the first region so that the first liquid crystal molecules deflect;
the second electrode is configured to applying a second electric field force to a second liquid crystal molecules which are located in the second region through the carrier platform and the reflection sheet so that the second liquid crystal molecules deflect.

* * * * *